United States Patent
Casses et al.

(10) Patent No.: US 9,017,096 B2
(45) Date of Patent: Apr. 28, 2015

(54) CONNECTOR DEVICE AND CONNECTOR ASSEMBLY FOR VEHICLE ELECTRICAL POWER SUPPLY OR TRANSMISSION IN A VEHICLE

(75) Inventors: Claude Casses, Clevilliers (FR); Frederic Menez, Hermeray (FR); Stephane Trancart, Faverolles (FR)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 136 days.

(21) Appl. No.: 13/817,553

(22) PCT Filed: Aug. 11, 2011

(86) PCT No.: PCT/IB2011/002085
§ 371 (c)(1),
(2), (4) Date: Mar. 25, 2013

(87) PCT Pub. No.: WO2012/023042
PCT Pub. Date: Feb. 23, 2012

(65) Prior Publication Data
US 2013/0303006 A1     Nov. 14, 2013

(30) Foreign Application Priority Data
Aug. 19, 2010 (WO) .................. PCT/IB2010/002442

(51) Int. Cl.
*H01R 31/08* (2006.01)
*H01R 13/44* (2006.01)
*H01R 13/703* (2006.01)
(Continued)

(52) U.S. Cl.
CPC ............ *H01R 13/44* (2013.01); *H01R 13/7032* (2013.01); *H01R 13/713* (2013.01); *B60L 11/1818* (2013.01); *B60L 3/0069* (2013.01);
(Continued)

(58) Field of Classification Search
USPC .................... 439/924.1, 924.2, 513, 510, 507
See application file for complete search history.

(56) References Cited

U.S. PATENT DOCUMENTS

| | | | | |
|---|---|---|---|---|
| 5,088,931 A | * | 2/1992 | Niciolo et al. | 439/188 |
| 5,993,263 A | * | 11/1999 | Sampson | 439/660 |
| 6,071,151 A | * | 6/2000 | Igarashi | 439/660 |
| 6,250,945 B1 | | 6/2001 | Murakami et al. | |
| 6,749,470 B2 | * | 6/2004 | Dangelmaier | 439/857 |

(Continued)

FOREIGN PATENT DOCUMENTS

| | | |
|---|---|---|
| EP | 1061614 A2 | 12/2000 |
| EP | 1248327 A2 | 10/2002 |

OTHER PUBLICATIONS

International Search Report dated Jun. 2, 2012.

*Primary Examiner* — Gary Paumen
(74) *Attorney, Agent, or Firm* — Robert J. Myers

(57) ABSTRACT

Connector assembly for electrical power supply or transmission in vehicles, comprising first and a second connector devices to be mated according to a mating axis. The first connector device comprises at least one spring device terminated by at least one electrically conductive head, movable in a spring load direction. The second connector device comprises at least one interlock terminal including an electrical conductor and an insulation cap arranged in such a way that, during the mating sequence, the at least one head touches first the insulation cap on one or several insulating areas and then contacts the electrical conductor on one or several conducting areas. Each of the one or several insulating areas is offset laterally with respect to each of the one or several conducting areas, according to a lateral direction perpendicular to the mating axis and to the spring load direction.

17 Claims, 8 Drawing Sheets

(51) Int. Cl.
*H01R 13/713* (2006.01)
*B60L 11/18* (2006.01)
*B60L 3/00* (2006.01)
*B60L 3/04* (2006.01)

(52) U.S. Cl.
CPC ............... *B60L 3/04* (2013.01); *Y02T 10/7005* (2013.01); *Y02T 90/14* (2013.01)

(56) References Cited

U.S. PATENT DOCUMENTS

| | | |
|---|---|---|
| 7,611,386 B1 * | 11/2009 | Zhang et al. ............... 439/660 |
| 7,934,939 B2 * | 5/2011 | Chen et al. ............... 439/352 |
| 2002/0142638 A1 | 10/2002 | Nishioka |
| 2007/0212918 A1 | 9/2007 | Gruebel et al. |

* cited by examiner

FIG. 3A
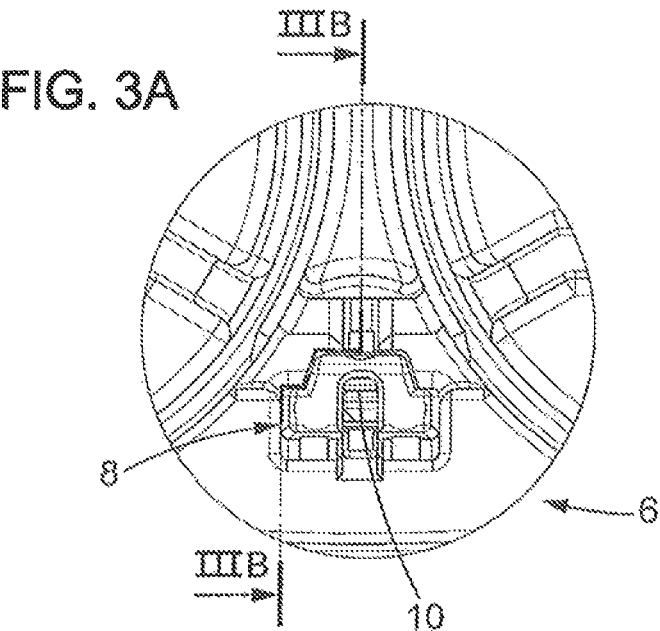
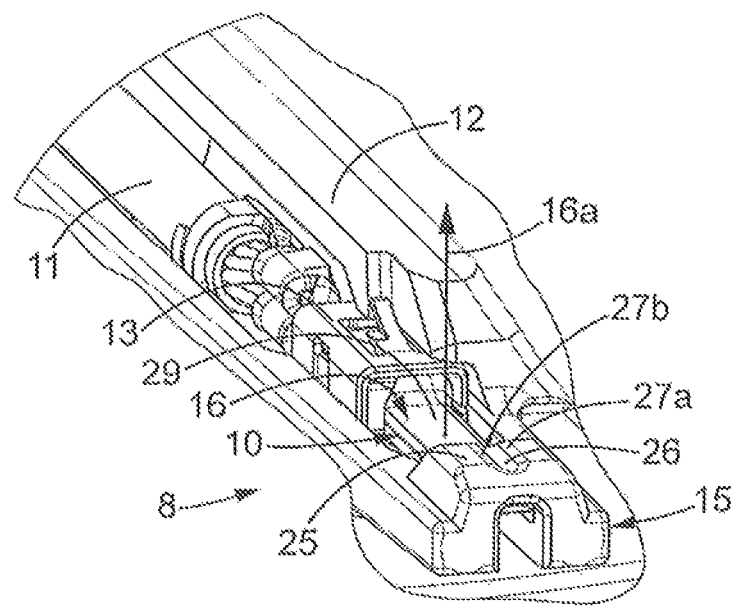
FIG. 3B

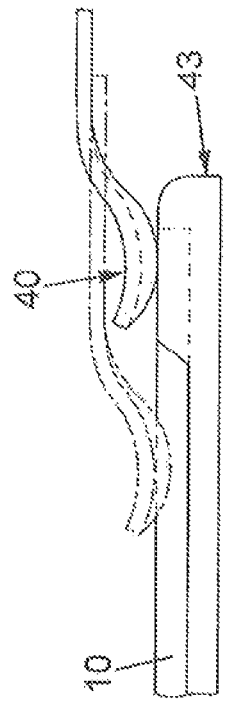
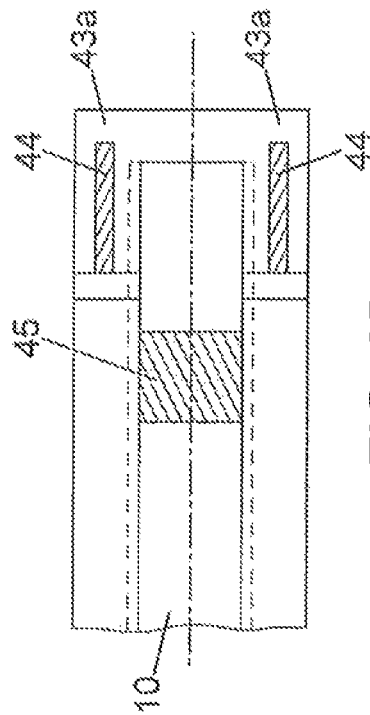
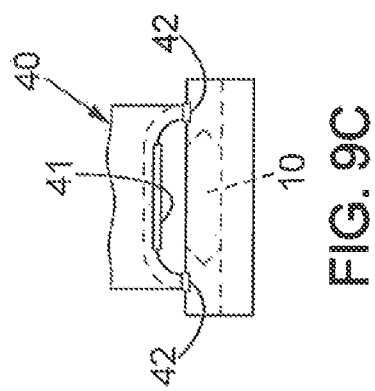

CONNECTOR DEVICE AND CONNECTOR ASSEMBLY FOR VEHICLE ELECTRICAL POWER SUPPLY OR TRANSMISSION IN A VEHICLE

CROSS-REFERENCE TO RELATED APPLICATIONS

This application is a national stage application under 35 U.S.C. §371 of PCT Application Number PCT/IB2011/002085 having an international filing date of Aug. 11, 2011, which designated the United States, which PCT application claimed the benefit of PCT Application Number PCT/IB2010/002442, filed Aug. 19, 2010, the entire disclosure of each of which are hereby incorporated herein by reference.

FIELD OF THE INVENTION

The invention relates to an electrical connector assembly, and corresponding connector devices and a connecting method for supplying or transmitting electrical power to vehicles, in particular to electricity-fuel hybrid driven vehicles or fully electrical driven vehicles.

BACKGROUND OF THE INVENTION

Such a connector assembly comprises a power receiving connector which is connected for instance to the battery or to the electrical motor of the vehicle and a power supply connector which is connected for instance to a power station or to a charger. For security reasons, it is required that little or no electrical current flows through the power terminals of the connector assembly during the connecting or disconnecting sequence.

Patent application WO 2010/015889 describes a connector assembly preventing the power supply source to send electrical power before the connector assembly is in a safe mated position. This connector assembly comprises a pair of interlock terminals which are electrically connected by a shunt only when a safe mated position is reached. A safety pilot circuit may continuously check the electrical resistance between the two interlock terminals in order to detect automatically when the connector assembly is mated so as to supply the power only when the connector assembly is fully mated. The safety pilot circuit may also detect when the mated connector assembly is going to be unmated, so as to reduce or stop the power before the electrical power terminals disconnection.

Therefore, the resistance of the two electrical connections between the interlock terminal and the shunt is a critical safety parameter for the connection/disconnection process. There is a need to make such a safety parameter less dependent of environmental conditions like dust or humidity for example.

The invention provides a connector assembly, corresponding connector devices and a connecting method which remedy to at least one of the above needs.

A goal of the invention is to make a safety parameter of a connector assembly used for supplying electrical power to vehicles, less dependent on environmental conditions.

BRIEF SUMMARY OF THE INVENTION

According to one aspect, an embodiment of the invention comprises a connector assembly for electrical power transmission in vehicles, comprising a first and a second connector device to be mated according to a mating axis. The first connector device comprises at least one spring device terminated by at least one electrically conductive head, movable in a spring load direction. The second connector device comprises at least one interlock terminal including an electrical conductor and an insulation cap arranged such that, during the mating sequence, the movable head touches first the insulation cap on one or several insulating areas and then contacts the electrical conductor on one or several conducting areas. At least one of the one or several insulating areas is laterally shifted with respect to at least one of the one or several conducting areas, following a lateral direction perpendicular to the mating axis and to the spring load direction.

In other words, there is not any common lateral position between at least one or several of the insulating areas and at least one of the conducting areas.

In a variant, each of the one or several insulating areas is laterally shifted with respect to each one of the one or several conducting areas, following a lateral direction perpendicular to the mating axis and to the spring load direction.

Due to poor environmental conditions, the insulation cap of the interlock terminal of the first connector device may contaminate or be contaminated by the movable head of the second connector device during a first step of the mating sequence. Thanks to the lateral shift between the insulating areas and the conducting areas, the conductive areas are not affected by such contamination. Therefore, the electrical resistance of the connection between the conductive head and the conducting area during the second step of the mating sequence is made independent from the pollution during the first step. Then, the corresponding safety parameter of the connector assembly is less dependent on environmental conditions.

On another aspect, an embodiment of a first type of connector device for electrical power supply or transmission in a vehicle, presents a mating axis and comprises at least one spring device terminated by at least one electrically conductive head which is movable in a spring load direction. This head includes a contact head surface which has a convex transversal section. With a transversally convex head, it is easier to clean up the head electrical contacting surface.

On another aspect, an embodiment of the second type of connector device for electrical power supply or transmission in a vehicle, presents a mating axis and comprises at least one interlock terminal including an electrical conductor axially terminated by an insulation cap. The insulation cap comprises a guiding portion which protrudes from an accessible side of the electrical conductor, in a protruding direction. The insulation cap comprises a recess which extends below the guiding portion and extends partially or totally in the axial alignment of the accessible side of the conductor.

In other embodiments, one might also use one or more of the features as defined in dependent claims.

BRIEF DESCRIPTION OF THE SEVERAL VIEWS OF THE DRAWING

Other characteristics and advantages of the invention will appear from the following description of several of its embodiments, provided as a non-limitative example, and of the accompanying drawings.

On the drawings:

FIG. 3a is a front view of a detail IIIB of FIG. 2, FIG. 3b is a cross section perspective view following line IIIB of the FIG. 3a, showing an interlock terminal and its insulation cap, FIGS. 9A, 9B, 9C are diagrams corresponding respectively to the side, the top and the front views of a third embodiment.

DETAILED DESCRIPTION OF THE INVENTION

Figure 1:
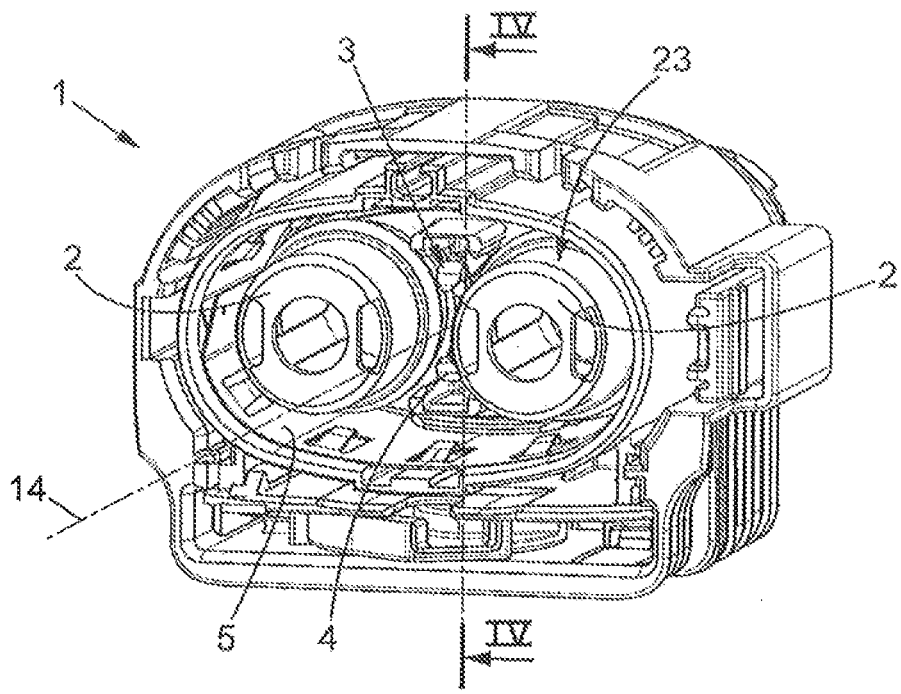
FIG. 1 is a perspective view of a first connector device of a first embodiment.

As illustrated in FIG. 1, the first connector device 1 comprises two female terminals (not shown) that are attached inside two female terminal casings 2. The first connector device 1 is for instance a power receiving connector to be connected to a battery of an electrical vehicle (not shown). It is a plug type connector and has a substantially oval cross-section, surrounding the two female terminal casings 2.

The first connector device 1 further comprises a shunt 3 comprising two movable heads 4, located in a vertical plane going through the middle of the two horizontal female terminals.

An inner oval shape includes a first EMI shield 5, surrounding all the electrical parts of the first connector device 1 including the two female terminals and the heads 4 of the shunt 3.

Figure 2:
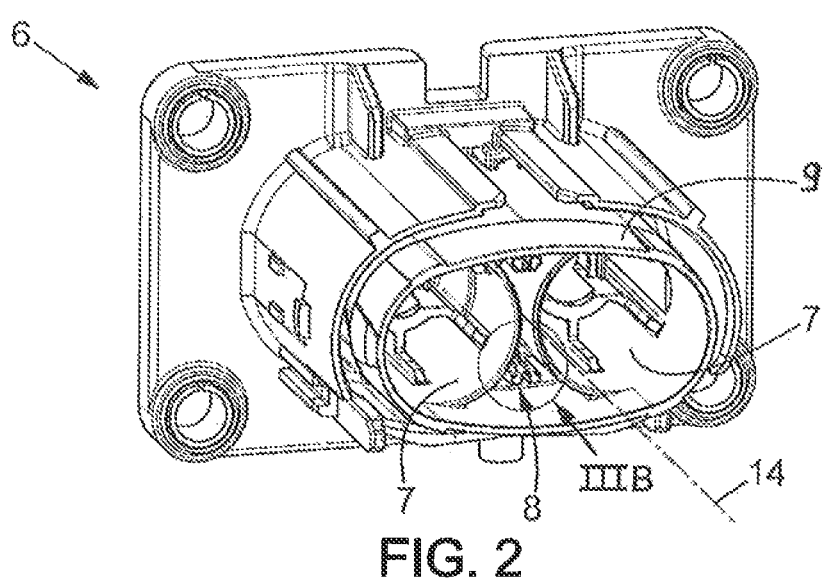
FIG. 2 is a perspective view of a second connector device of the first embodiment.

According to FIG. 2, a second connector device 6 comprises two power plug terminals (not shown) attached inside two male terminal casings 7. The second connector device 6 is a socket connector to be connected for instance to an electrical power station (not shown). The first connector device 1 (see FIG. 1) and the second connector device 6 (see FIG. 2) have a common mating axis 14 along which the first and second connector devices 1, 6 can be mechanically and electrically coupled.

The second connector device 6 comprises two interlock terminals 8 symmetrically positioned in a vertical plan passing through the middle of the horizontal male terminals and located in order to receive each one of the two heads 4 from the first connector device 1.

An inner oval shape includes a second EMI shield 9 surrounding all of the electrical part of the second connector device 6 and electrically connected to the first EMI shield 5 when the first and the second connector devices 1, 6 are mated.

Both first and second connector devices 1, 6 comprise an outer oval wall comprising coupling mechanisms, fully described in the application WO 2010/015889, the entire disclosure of which is hereby incorporated herein by reference.

As illustrated in the detailed FIGS. 3A and 3B, each interlock terminal 8 comprises an electrical conductor 10 which is flat, crimped to an electrical wire 11 connected to a safety pilot circuit of the power station, and which is attached into a connector insulator 12 by a square-shaped contact body 13.

Each interlock terminal 8 further comprises an insulation cap 15 surrounding both side of the end of the electrical conductor 10, as well as the axial front side of this end.

Figure 4:
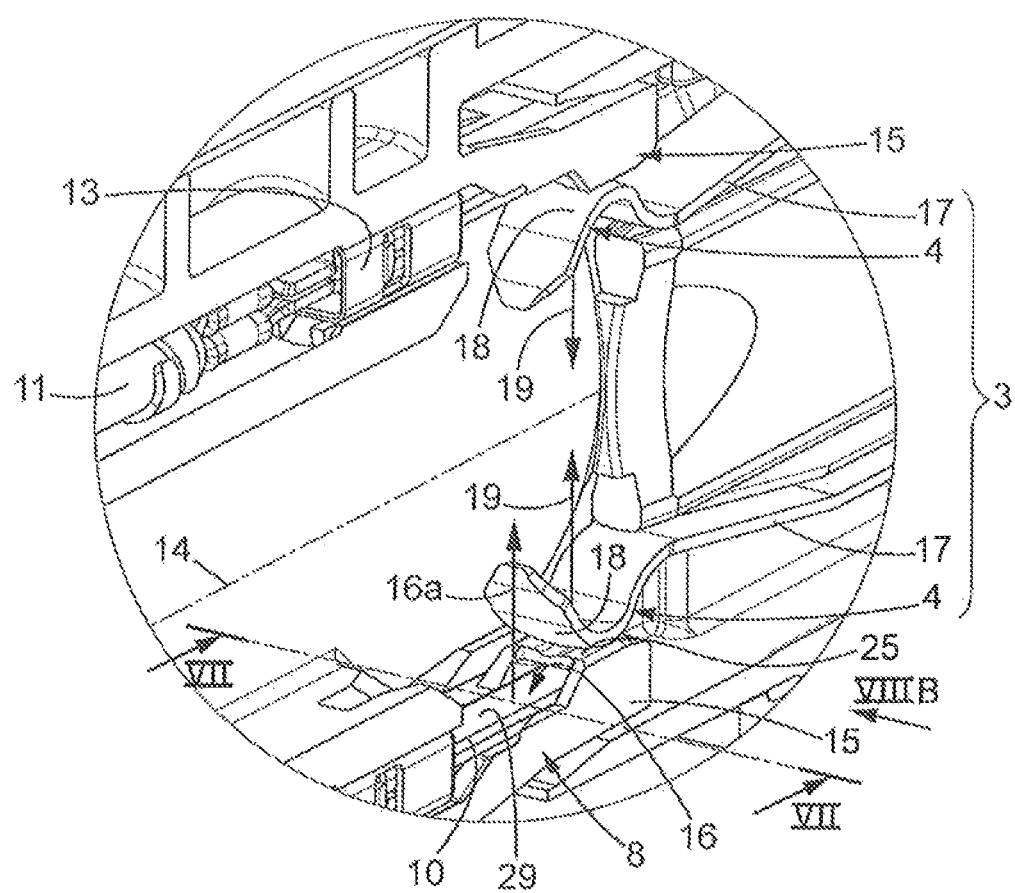
FIG. 4 is a cross section perspective view following plane 4 of FIG. 1, showing the conductive head together with the insulation cap.

As illustrated in FIG. 4, the mating sequence between the heads 4 and the interlock terminals 8 includes a first step where the heads 4 slide respectively along the insulation caps 15, and a second step where the heads 4 contact the electrical conductors 10.

Each interlock terminal 8 presents a lateral accessible side 16 by which the electrical conductor 10 is accessible, the opposite side being covered by the connector insulator 12. Due to that, the electrical conductor 10 can be electrically connected only by a conductive head 4 which is movable perpendicularly to the mating axis 14 and perpendicularly to the lateral accessible side 16.

The insulation cap 15 comprises a guiding portion 25 designed to be first touched by a head 4 during the mating sequence. The guiding portion 25 guides the movement of this head 4 during the first portion of the mating sequence, up to and not including the electrical contact between the conductive head 4 and the conductor 10.

In the particular case of the first embodiment, the guiding portion 25 protrudes from the accessible side 16 in a protruding direction 16a which is perpendicular to the mating axis 14, perpendicular to the accessible side 16 and directed from the accessible side 16 toward the opposite one.

The insulation cap 15 further includes a recess 26 (best seen in FIG. 3B) which extends below the guiding portion 25 and extends in the axial alignment of the accessible side 16 of the conductor 10. The recess 26 extends axially along the axial length of the guiding portion 25.

The shunt 3 comprises two spring tongues 17 (see FIG. 4) terminated by a corresponding head 4. When entering into the second connector device 6, the head 4 touches first the insulation cap 15. This bends the corresponding spring tongue 17 in the spring load direction 19 indicated by the arrow. The spring load direction 19 is perpendicular to the mating axis 14 and to the accessible side 16. The spring load direction 19 is directed from the accessible side of one interlock terminal 8 towards the opposite one. In the illustrated first embodiment, the spring load direction 19 of both heads 4 is oriented toward the centre of the first connector 1. But the spring load directions 19 and the corresponding accessible side may be in any perpendicular direction with respect to the mating axis 14.

The shunt 3 is oriented in the first connection device 1 so that the spring load direction 19 is substantially parallel to the protruding direction 16a of the interlock terminal 8 of the second connector device 6.

The insulation cap 15 comes in a single piece with the connector insulator 12. This provides a very precise transition location between the first and the second steps of the mating sequence of the interlock terminal 8 with the shunt 3. The relative position between the first and the second connector devices, when the head 4 first contacts the electrical conductor 10 is independent from the location of the contact body 13 inside the connector insulator 12. Therefore, the first contact with the shunt 3 can be used to drive the electrical power sent through the power terminals.

The depth of the recess 26, with respect to the top of the guiding portion 25 is such that, during the first step of the mating sequence, the head 4 does not touch the bottom of the recess 26. Consequently, the head 4 includes a surface portion which is not in contact with the insulation cap 15 and cannot contaminate or be contaminated by the insulation cap 15. As at least a portion of the recess 26 and at least a portion of the accessible side 16 of the conductor 10 are axially aligned, the surface portion of the head 4 which is not in contact with the insulation cap 15 will not contaminate the conductor 10. Therefore, the resistivity of the electrical contact is made more reliable.

Figure 5:
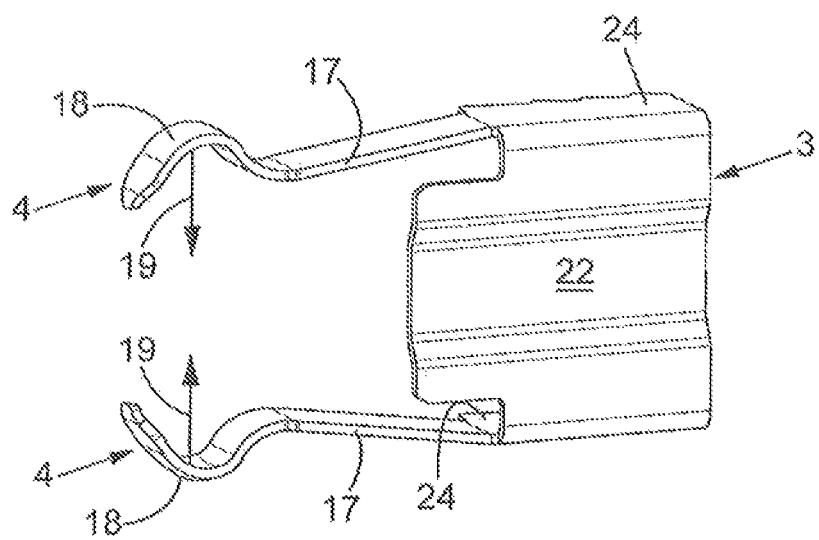
FIG. 5 is a perspective view of the shunt of the first embodiment.
Figure 6:
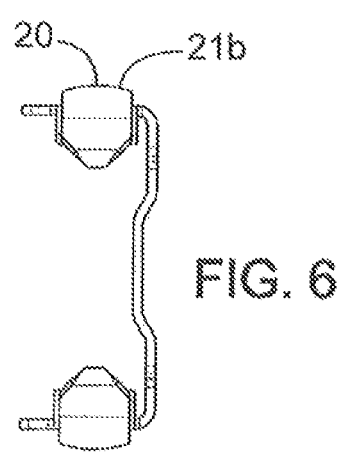
FIG. 6 is the front view of the shunt of the first embodiment.

As illustrated in FIGS. 4, 5, and 6, each head 4 of the shunt 3 has the shape of a spoon. It has a contact surface 18 with an apex point 20 (see FIG. 6) with respect to the spring load direction 19. The contact surface 18 has a convex cross-section in any plane passing by the apex point 20 and by the spring load direction 19. In particular, the contact surface 18 has a convex longitudinal cross-section and a convex transversal cross-section 21b (see FIG. 7). The convex transversal cross-section 21b is considered in a plane, perpendicular to the mating axis 14 and passing by the contact point of a head 4 with the electrical conductor 10.

The shunt 3 is a single piece made of a cut and folded conductive metal sheet. It comprises a base portion 22 having a global U-shape (see FIGS. 5 and 6) designed to be fitted into a corresponding receiving portion of an insulator body 23 of the first connector device 1 (see FIG. 1). The elasticity of the U-shaped base portion 22 is used for clipping the shunt 3 into the insulator body 23. The two spring tongues 17 extend axially from each lateral side 24 of the base portion 22.

Figure 7:
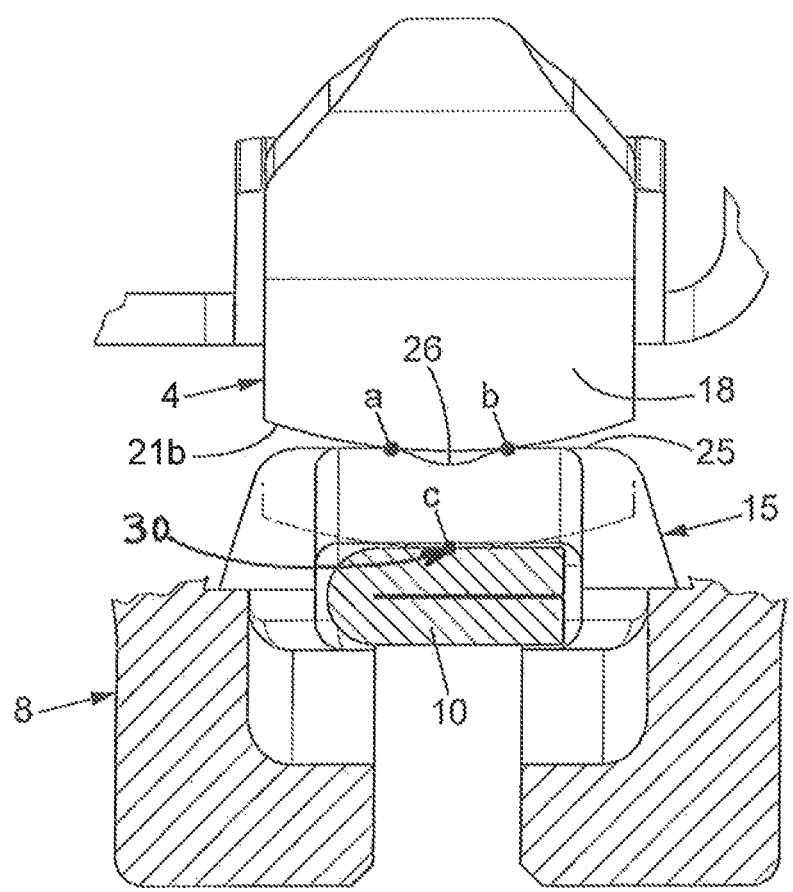
FIG. 7 is a cross section view of the interlock terminal of the first embodiment, showing the conductive head first touching the insulation cap, and then contacting the conductor.

In FIG. 7, the head 4 is illustrated with a continuous line during the first step and with a dotted line during or after the second step of the mating sequence. The spoon-shaped head 4 touches, during the first step, the insulation cap 15 at two sliding contact points "a" and "b", located on each side of the recess 26. The surface portion of the insulation cap 15, where the sliding contact points a, b slide, is called "an insulating area" 27a, 27b (see FIG. 3b). The surface of the head 4 where the sliding contact points a, b slide is called "a head touching area" 28a, 28b.

During the second step of the mating sequence, the spoon-shaped head 4 touches the electrical conductor 10 on a sliding contact point "c". The surface of the electrical conductor 10 on which the contact point "c" slides is called "a conducting area" 29. The surface of the conductive head 4 on which the sliding contact point "c" slides is called "a head contacting area" 30. In the present first embodiment, the contact point "c" on the head 4 corresponds to the apex point 20. Therefore, the head contacting area 30 is a spot area. The conducting area 29 is a segment corresponding to the second step course.

Figure 8A:
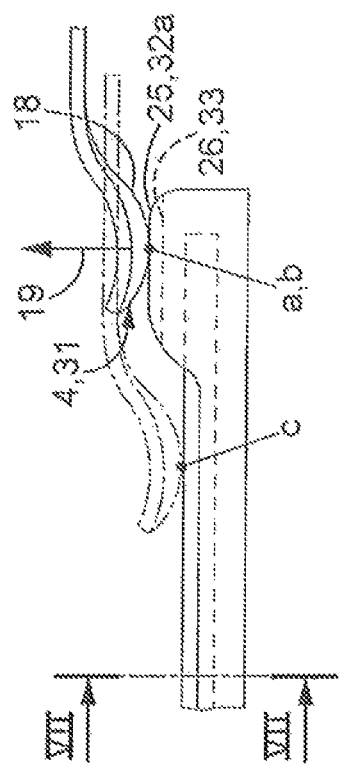
FIGS. 8A, 8B, 8C are diagrams corresponding respectively to the side, the top and the front views of the first embodiment, showing the touching and the contacting areas.
Figure 8B:
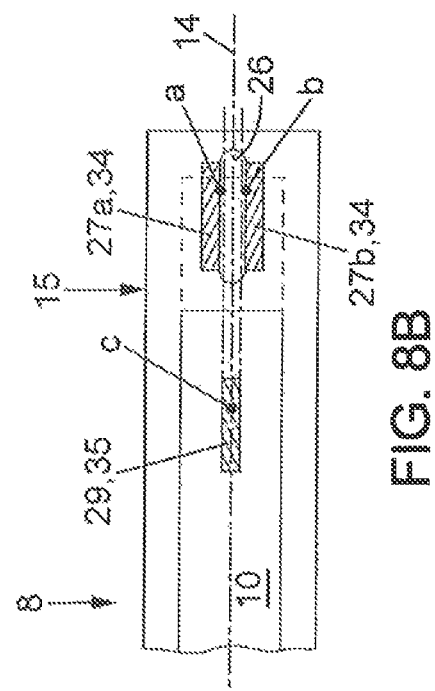
Figure 8C:
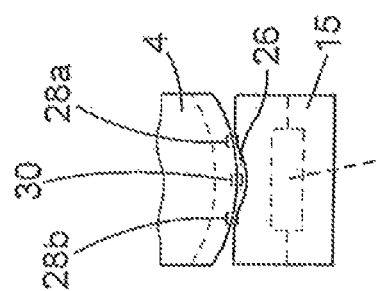

The FIGS. 8A, 8B, 8C summarize the above described embodiment. The guiding portion 25 comprises two insulating areas 27a, 27b, separated by a recess 26. The spoon shaped head 4 includes a head contacting area 30 which is not touched by the recess 26. In other words, the insulating areas 27a, 27b are both shifted laterally from the conducting area 29 as visible in FIG. 8B. The lateral direction is perpendicular to the mating axis 14 and to the spring load direction 19.

To avoid dust contamination between the insulating areas 27a, 27b and the conductive area 29, a minimum lateral distance is left in between, for example larger than 0.1 millimeters (mm), preferably larger than 0.5 mm, most preferably larger than 0.8 mm.

The power station continuously samples the resistivity between the two interlock terminals 8 by periodic measurements. During the first step of the mating sequence, the resistivity is very high and the electrical power contacts are not powered. When the resistivity falls, the information is given to the power station that electrical power contacts are securely mated and that the electrical power sent through the power contact may increase.

The connector assembly may be on the way to be disconnected, while the transmitted power is still high. As the conductive head 4 has a wave-shaped longitudinal section, and as the insulation cap 15 protrudes from the electrical conductor 10, the disconnection sequence of the interlock terminal 8 occurs so that the back of the wave-shaped head 4 touches first the protruding extremity of the insulation cap 15. The head 4 then slides along the insulation cap 15 by the angle of the back of the wave-shape which is between 50 to 80 degrees from the mating axis 14. The speed by which the head 4 is lifted off from the conductor 10 is multiplied by the tangent of that angle. This makes the disconnection of the interlock terminal 8 quicker and more reliable. This allows the power station to decrease the transmitted power before the power contact disconnection enters in a less safe phase.

Figure 8D:
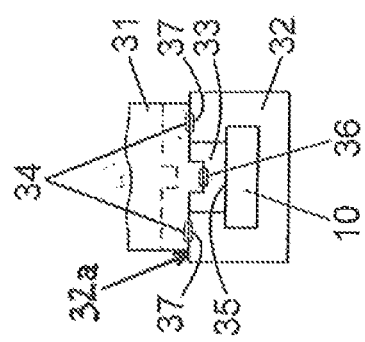
FIG. 8D is a diagram of a second embodiment corresponding to a front view.

FIGS. 8A and 8B are also the side and the top views of the second embodiment illustrated in FIG. 8D. In this second embodiment, the first connector device 1 comprises a head 31 without a convex contact surface. The second connector device 6 comprises an insulation cap 32 having an open U-shape which does not necessarily surround the two sides and the front end of the electrical conductor 10. The insulation cap 32 has a guiding portion 32a and a recess 33 which is not touched by the head 31. However, the insulating area 34 protrudes from the conducting area 35 in the protruding direction/spring load direction 19, over a larger distance than the corresponding distance between the head contacting area 36 and the head touching area 37.

One can easily understand that a variant of the second embodiment may include only one guiding portion 32a and the corresponding insulating area 34.

Another variant may have several parallel conducting areas 35.

In any of the variants of the second embodiment, each insulating areas 34 extends laterally aside of each conducting areas 35 (see FIG. 8B). In other words, there is an offset in the lateral position of each one of the insulating areas 27a, 27b, 34 with respect to any of the conducting areas 29, 35.

The third embodiment illustrated in FIGS. 9A, 9B, 9C comprises a conductive head 40 including a contacting area 41 which is at a bottom of a recess towards the spring load direction 19 from the touching area 42. The third embodiment further comprises an insulation cap 43 including a guiding portion 43a which does not protrude from the electrical conductor 10. However, both insulating areas 44 are laterally offset from the conducting area 45. In several variants, the number of contact points may be different.

Figure 10A:
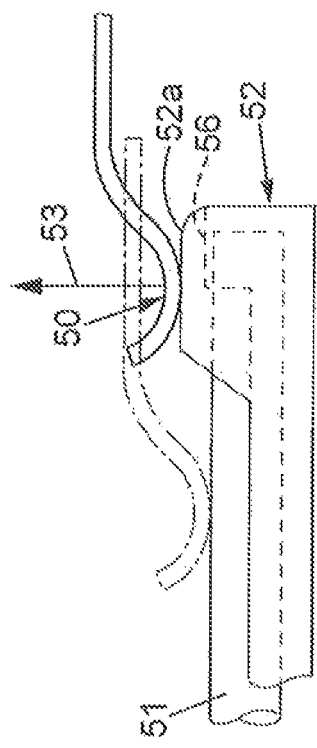
FIGS. 10A, 10B, 10C are diagrams corresponding respectively to the side, the top and the front views of a fourth embodiment.
Figure 10C:
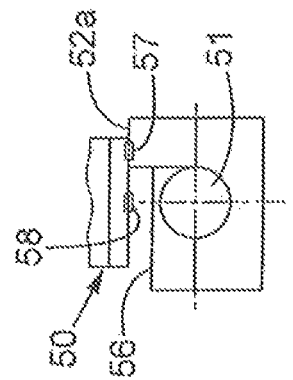
Figure 10B:
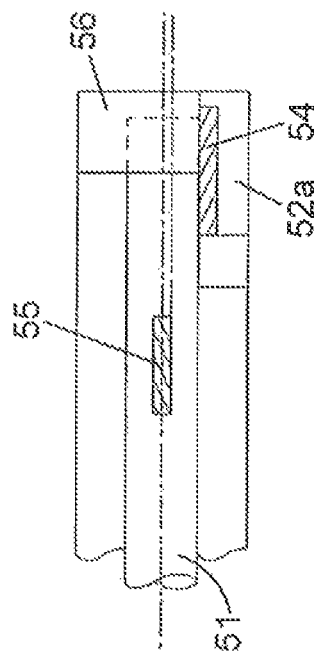

The fourth embodiment, illustrated in FIGS. 10A, 10B, 10C, comprises a head 50 which has a straight transversal section. This makes the shunt 3 simple to be manufactured. The interlock terminal 8 includes an electrical conductor 51 which is not flat and is accessible from several accessible sides. However, there is still an insulation cap 52 with a guiding portion 52a able to guide and support the head 50 against a spring load direction 53 above a recess 56. The corresponding insulating area 54 is still shifted laterally from the conducting area 55.

The invention claimed is:

1. A connector assembly for electrical power transmission in a vehicle, comprising:
   a first connector device; and
   a second connector device to be mated along a mating axis,
   wherein the first connector device includes at least one spring device terminated by at least one electrically conductive head, movable in a spring load direction perpendicular to the mating axis,
   wherein the second connector device includes at least one interlock terminal including an electrical conductor and an insulation cap, said at least one head configured to slide along the insulation cap on at least one insulating area in a direction parallel to the mating axis during a first step of a mating sequence and then contacts the electrical conductor on at least one conducting area during a second step of the mating sequence, and
   wherein the at least one insulating area extends laterally aside of the at least one conducting area, according to a lateral direction perpendicular to the mating axis and to the spring load direction.

2. The connector assembly according to claim 1, wherein the insulation cap includes a recess, the bottom of which being not touched by the at least one head, and wherein lateral positions, along which the recess extends along the mating axis, cover the lateral positions of the at least one conducting area when the first connector device and the second connector device are mated.

3. The connector assembly according to claim 1, wherein the at least one insulating area extends a predetermined distance in the spring load direction from the at least one conducting area.

4. The connector assembly according to claim 1, wherein the at least one head touches the insulation cap by a head touching area and contacts the electrical conductor by a head contacting area, the head touching area being separated from the head contacting area.

5. The connector assembly according to claim 4, wherein the head touching area is laterally separated the head contacting area by 0.1 millimeters to 0.8 millimeters.

6. The connector assembly according to claim 4, wherein the head touching area extend a predetermined distance in the spring load direction from the head contacting area.

7. The connector assembly according to claim 1, wherein the first connector device comprises a shunt including two heads electrically interconnected and the second connector device comprises two corresponding interlock terminals.

8. The connector assembly according to claim 1, comprising a pair of a first electrical power contact and a second electrical power contact respectively attached in the first connector device and in the second connector device, the first and second electrical power contacts being adapted to transmit the electrical power.

9. The connector assembly according to claim 7, wherein the shunt has a global U-shape and comprises two spring tongues extending from lateral sides of the U-shape, each spring tongue being terminated by a corresponding conductive head.

10. The connector assembly according to claim 7, comprising a pair of two identical or symmetrical interlock terminals.

11. A connector device for electrical power transmission in a vehicle, presenting a mating axis along which another connector device can be mated, said connector device comprising:
    at least one spring device terminated by at least one electrically conductive head which is movable along a spring load direction perpendicular to the mating axis, the at least one head configured to slide along at least one insulating area of an insulation cap of the other connector device in a direction parallel to the mating axis during a first step of a mating sequence, and then contact at least one conducting area of an electrical conductor of the other connector device during a second step of the mating sequence, wherein the at least one insulating area extends laterally aside the at least one conducting area according to a lateral direction perpendicular to the mating axis and to the spring direction.

12. The connector device according to claim 11, further comprising a shunt including two identical or symmetrical conductive heads, electrically interconnected.

13. The connector device according to claim 12, wherein the shunt has a global U-shape and comprises two spring tongues extending from lateral sides of the U-shape, each spring tongues being terminated by a corresponding conductive head.

14. The connector device according to claim 11, wherein the at least one head includes a contact head surface which has a convex transversal section.

15. A connector device for electrical power transmission in a vehicle, presenting a mating axis along which another connector device can be mated, said connector device comprising:
    at least one interlock terminal including an electrical conductor axially terminated by an insulation cap; at least one electrically conductive head of the other connector device is movable along a spring load direction perpendicular to the mating axis and is configured to slide along at least one insulating area of the insulation cap in a direction parallel to the mating axis during a first step of a mating sequence, and then contact an electrical conductor of the connector device on at least one conducting area during a second step of the mating sequence, wherein the at least one insulating area extends laterally aside the at least one conducting area according to a lateral direction perpendicular to the mating axis and to the spring load direction.

16. The connector device according to claim 15, comprising a pair of two identical or symmetrical interlock terminals.

17. The connector device according to claim 15, wherein the insulation cap comprises a guiding portion which protrudes from an accessible side of the electrical conductor, in a protruding direction and wherein the insulation cap comprises a recess which extends below the guiding portion and extends in partial axial alignment of the accessible side of the electrical conductor.

* * * * *